No. 621,633. Patented Mar. 21, 1899.
T. CROW.
PLANTER.
(Application filed July 5, 1898.)

(No Model.) 2 Sheets—Sheet 1.

WITNESSES:

INVENTOR
T. Crow.
BY
ATTORNEYS.

No. 621,633. Patented Mar. 21, 1899.
T. CROW.
PLANTER.
(Application filed July 5, 1898.)
(No Model.) 2 Sheets—Sheet 2.
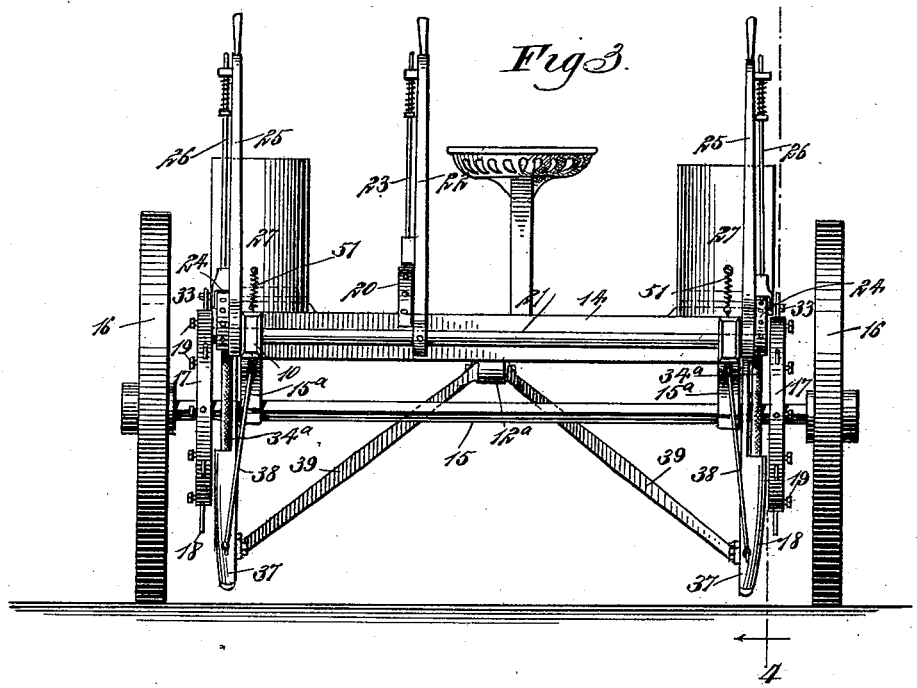
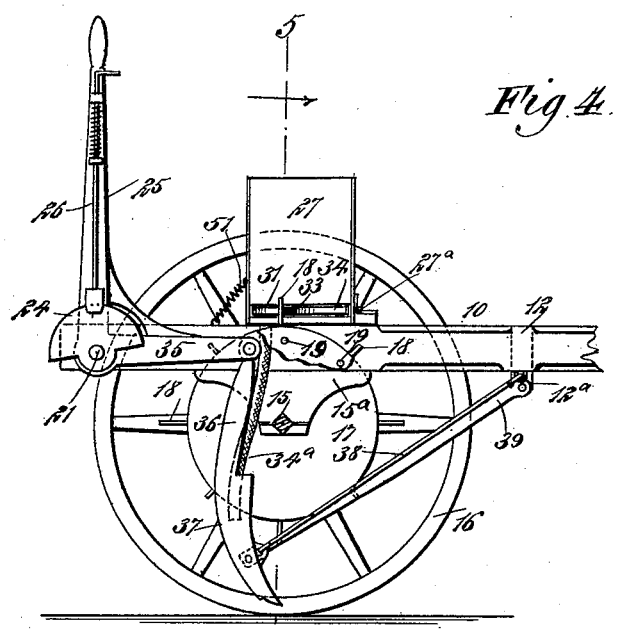
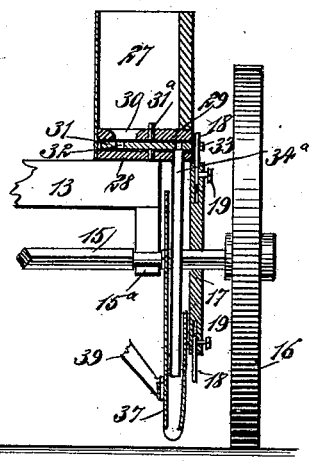
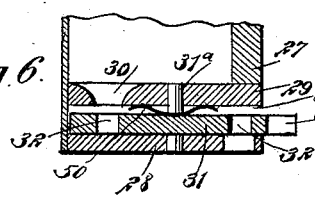
WITNESSES:
INVENTOR
T. Crow
BY
ATTORNEYS.

ated March 21, 1899.

UNITED STATES PATENT OFFICE.

THEODORE CROW, OF CAMERON, WEST VIRGINIA.

PLANTER.

SPECIFICATION forming part of Letters Patent No. 621,633, dated March 21, 1899.

Application filed July 5, 1898. Serial No. 685,112. (No model.)

*To all whom it may concern:*

Be it known that I, THEODORE CROW, of Cameron, in the county of Marshall and State of West Virginia, have invented a new and Improved Planter, of which the following is a full, clear, and exact description.

The object of the invention is to provide a planter of simple, durable, and economic construction, of easy draft, and which will require the services of but one horse.

Another object of the invention is to provide a construction of planter that will be under easy control of the driver and that will be adapted to any character of ground.

A further object of the invention is to provide a planter with a simple and positive, yet adjustable, dropping mechanism and to build a planter of but few parts, any of them being interchangeable; furthermore, to so construct and assemble the parts that the entire machine can be dismantled or be put together or necessary repairs or adjustments be made by any one of ordinary intelligence.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
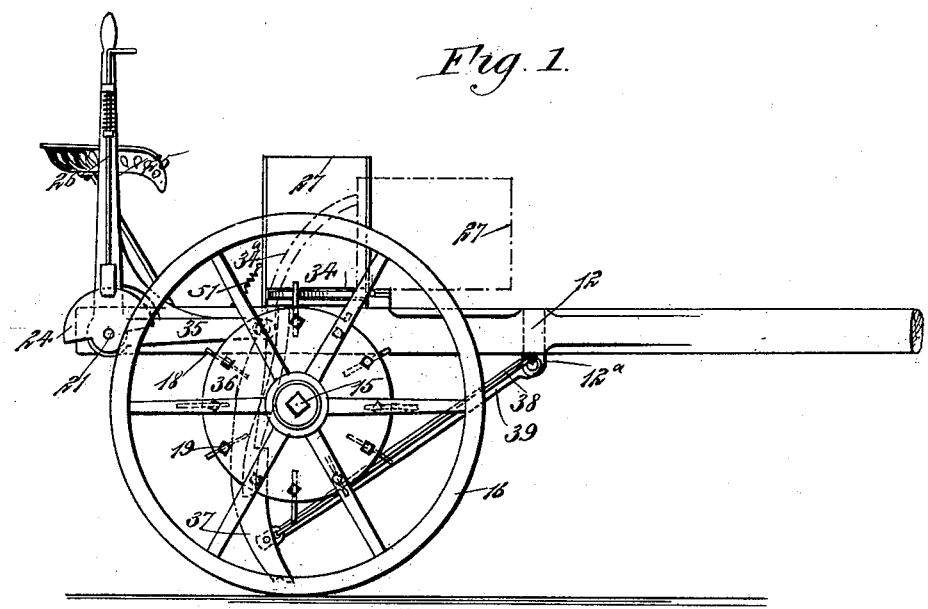
Figure 2:
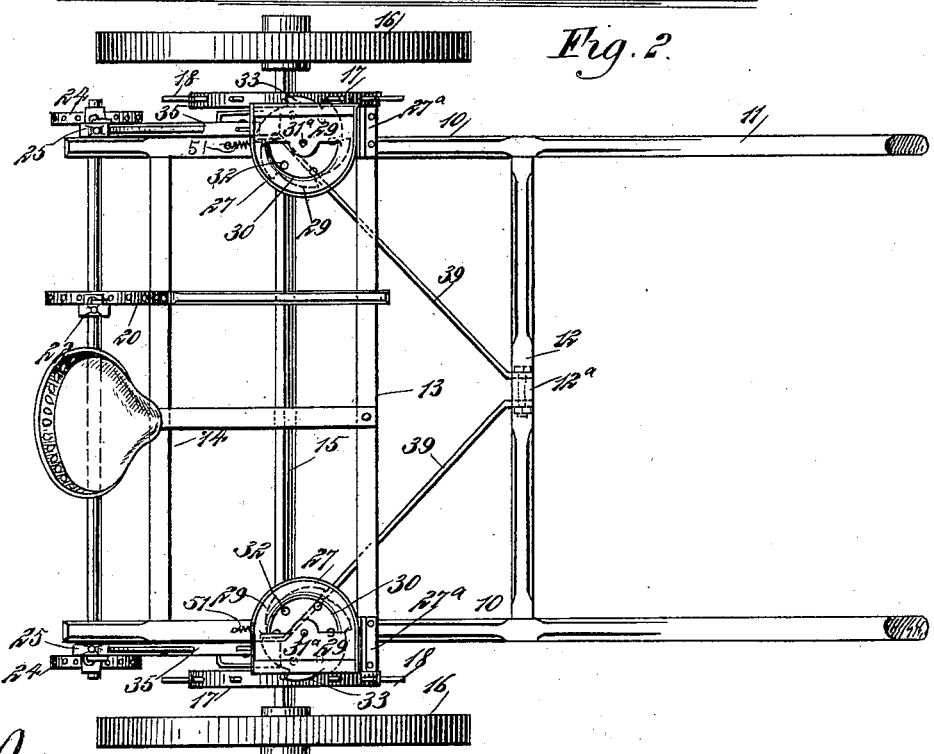

Figure 1 is a side elevation of a planter constructed in accordance with my invention. Fig. 2 is a plan view of the planter. Fig. 3 is a rear elevation. Fig. 4 is a longitudinal vertical section taken substantially on the line 4 4 of Fig. 3. Fig. 5 is a detail transverse section taken through one of the seedboxes and its connections, the section being practically on the line 5 5 of Fig. 4; and Fig. 6 is a detail sectional view of the bottom portion of a seedbox.

The frame of the machine usually consists of two side pieces 10, which are carried forward to form shafts 11, since the machine is adapted to be drawn by a single horse. Where the shaft-sections join the side sections of the frame, a cross-bar 12 is located, and near the rear a second cross-bar 14 is secured, and between the cross-bars 12 and 14 an intermediate cross-bar 13 is secured, while between the two cross-bars 13 and 14 an axle 15 is journaled in suitable bearings 15ª, whereby the axle is brought below the level of the frame. The planter is of that type known as the "whole-hill drop"—that is to say, each hole of the seed plates or wheels employed will contain enough corn for a hill and will drop the corn automatically one, two, three or more feet apart, according to the discretion of the operator.

Each end of the axle extends well beyond the sides of the frame, so that the machine may conveniently straddle a row, and at each outer end of the axle a supporting-wheel 16 is fastened, so that the axle turns with said wheels. Between the hub of each supporting-wheel and the frame of the machine a distance-wheel 17 is secured to the said axle, and this distance-wheel is in the nature of a disk, being provided with removable and adjustable peripheral pins 18, the openings for the pins being ordinarily twelve in number, and the pins may be adjusted endwise and held in position in the distance-wheel to which they belong by means of set-screws 19, passed through the outer faces of the said wheels, as is shown particularly in Figs. 1 and 5.

A rack 20 is rigidly secured to the rear cross-bar 14 of the frame, said rack being carried beyond the said cross-bar, as shown in Fig. 2, and a shaft 21 is journaled in the projecting rear end portions of the side bars of the frame, the shaft passing below the rack 20. A lever 22 is secured to the shaft 21 adjacent to the rack 20, and the lever 22 is provided with a suitable thumb-latch 23, adapted to enter openings or their equivalents in the rack 20. A rack 24 is also secured to each end of the shaft 21 outside of the frame. All of the racks are preferably segmental in shape, and a lever 25 is loosely mounted upon each end of the shaft 21 between the frame and an outer rack 24, the levers 25 being provided with thumb-latches 26, adapted for engagement with the aforesaid racks 24. The frame is adapted to carry two seedboxes 27, and these seedboxes are connected by hinges 27ª with the intermediate cross-bar 13 of the frame, which cross-bar extends beyond the sides of the frame, and the seedboxes are located adjacent to the ends of this cross-bar and adjacent to the distance-wheels 17, as shown best in Fig. 2. Although the seedboxes may be of any desired shape, they are preferably of semicylindrical form, their flat or straight faces being their outer faces, and these faces are adjacent to the distance-wheels 17.

The seedboxes are provided with suitable covers and means for locking them; but said covers are not shown in the drawings. Each seedbox is provided with a bottom 28, and a partition 29 is located above the bottom, a space intervening the partition and the bottom, the said partition being preferably provided with a semicircular opening 30, and the partition adjacent to the curved edge of this opening is made to incline in direction of said edge. A seed plate or wheel 31 is mounted to revolve between the partition 29 and the bottom 28 of each seedbox. The seed plate or wheel 31 is mounted to revolve between the partition 29 and the bottom 28 of each seedbox. The seed wheel or plate is preferably in the nature of a disk, and the pivots of the wheels are illustrated at 31ª in Figs. 2 and 6. Each seed wheel or plate is provided with a number of openings or pockets 32, adapted to hold the seed. Ordinarily these openings or pockets 32 are five in number, and each seed plate or wheel is further provided with peripheral teeth 33, that correspond in number and are located opposite the seed openings or pockets 32, and as the seed plates or wheels revolve their teeth 33 pass through and extend beyond openings 34, made in the bottom portion of the straight faces of the seedboxes, so that the teeth of the seed wheels or plates may be engaged by the pins 18, carried by the distance-wheels 17, the seed wheels or plates receiving movement from the distance-wheels, and the position of the pins on the periphery of the wheels regulates the distance between the hills planted. An opening is made in the bottom 28 of each seedbox, so that the said openings will register with an aperture 32 in a seed-plate when the tooth 33 near said aperture is to be engaged by one of the pins of a distance-wheel, as shown in Fig. 5, and this opening in the bottom of the seedbox is in direct communication with a tube 34ª, the said tube being preferably made of flexible material.

A spring 50 is secured to the bottom of each seedbox, which springs are made to engage with the seed plates or disks 31, as shown in Fig. 6, for the purpose of holding the seed plates or wheels firmly at each drop and so that the peripheral teeth of the distance-wheel will properly engage the teeth on the seed-plates.

An arm 35 is secured to each lever 25, the arms 35 being carried forwardly, and the arm 35 of each of the said levers is connected with a strap 36, which strap 36 forms a continuation of a shoe 37, the said shoe being forwardly and downwardly curved, receiving within it the lower end of one of the flexible tubes 34ª, as shown in Fig. 4. The seed received by the flexible tubes is conducted to the shoes and through the shoes is delivered to the ground. Small links 38 are attached to the lower portion of the shoes 37, and these links are preferably carried upwardly and forwardly and connected with the main frame at the point where the front cross-bar 12 connects with the side bars, and braces 39 are pivotally attached to the shoes 37, the said braces being carried forward in converging lines and pivoted one at each side of a partition 12ª, formed upon the under face of the front cross-bar 12 of the frame, as shown best in Figs. 1, 2, 3, and 4.

In operation when the machine is carried to or from the field the seedboxes are carried to the forward horizontal position shown in dotted lines in Fig. 1, which will take the teeth of the seed-plates out of the path of the pins on the distance-wheels, it being simply necessary to restore the seedboxes to their vertical position when the field is reached.

It will be observed that either shoe belonging to the seedboxes may be raised or lowered independently, as required, and that after the shoes have been fixed with relation to the ground over which they are to travel both of the shoes may be raised simultaneously by the manipulation of the central lever 22. In the adjustment of the pins in the distance-wheels said pins need not be removed from the wheels, since the openings prepared to receive the pins are of sufficient depth to be carried to a position which will prevent their engaging with the planting plates or wheels. Should the operator desire to drop the corn three feet apart, it is simply necessary to adjust every third tooth in either wheel or plate 17. If it be his pleasure to drop the corn two feet apart, he sets every other tooth so that it will operate upon the seed-plates, and should the operator desire to plant corn or other seed every twelve inches apart each tooth in each distance-wheel is brought in position to engage with the seed-dropping plate in connection with which it is to be employed. Springs 51 are preferably attached to the seedboxes and to the frame of the machine in order to prevent the boxes moving up and down when the machine is in motion. It will be understood that both drive-wheels may be provided with ratchets such as are used upon mowing-machines to enable the planter to work perfectly upon a circle or short turn.

Having thus described my invention, I claim as new and desire to secure by Letters Patent—

1. In a seed-planter, the combination with a wheel-supported frame, two seedboxes on the frame, and shoes for receiving seed from the boxes, of a shaft extended across the frame, levers loosely mounted on said shaft, means for locking the levers to the shaft, arms extended from the levers and having connection with the shoes, the said levers being for the adjustment of the shoes, one independently of the other, and a lever affixed to the shaft, whereby both shoes may be adjusted together, substantially as specified.

2. In a seed-planter, the combination with a wheel-supported frame, of a seedbox thereon and provided with an outlet in its bottom, a drop-plate mounted to rotate in the seedbox and extended out through an opening in the side of the box, the said plate having a series of peripheral projections, a rotating distance-plate, pins adjustable lengthwise in holes in the periphery of the distance-plate, the said holes being sufficiently deep to permit inward movement of the pins to clear the projections on the drop-plate, and set-screws for holding the pins as adjusted, substantially as specified.

THEODORE CROW.

Witnesses:
M. B. HELMS,
BRUCE CROW.